April 18, 1961

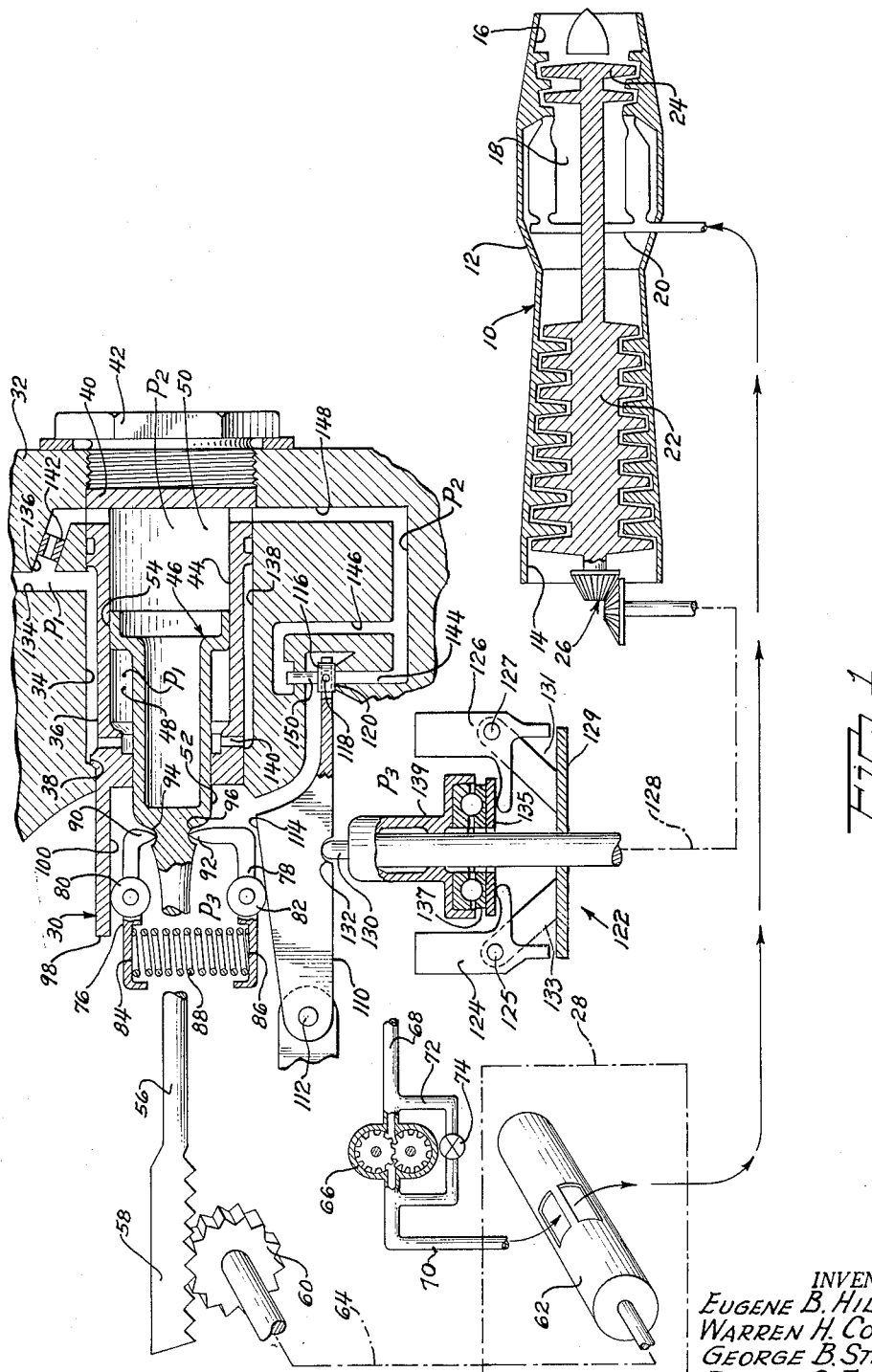

E. B. HILKER ET AL 2,980,069

MECHANICAL COMPUTING DEVICE

Filed Nov. 24, 1958

LEGEND $F_N$ = FORCE FROM SPEED SENSE
$L_N$ = FIXED LEVER ARM OF $F_N$
$F_S$ = FORCE OF SPRING 88
$X$ = VARIABLE LEVER ARM OF $F_S$
$K$ = SLOPE OF RAMP 114

INVENTORS
EUGENE B. HILKER,
WARREN H. COWLES,
GEORGE B. STROH, &
ROBERT S. FLEMING.

By Walter Patnoha, Jr.
ATTORNEY

United States Patent Office 2,980,069
Patented Apr. 18, 1961

2,980,069

MECHANICAL COMPUTING DEVICE

Eugene B. Hilker and Warren H. Cowles, Detroit, George B. Stroh, Grosse Pointe Woods, and Robert S. Fleming, Detroit, Mich., assignors to Holley Carburetor Company, Van Dyke, Mich., a corporation of Michigan Filed Nov. 24, 1958, Ser. No. 776,085

8 Claims. (Cl. 121—41)

This invention relates generally to engine fuel controls, and more specifically to the means employed in such fuel controls for sensing the various parameters on which the rate of fuel flow depends.

It is well known that parameters of speed, temperature and pressure are used independently and/or collectively for controlling and determining the operation of turbine power plants. Various hydraulic mechanisms have been designed which would sense the magnitudes of these parameters and react in an appropriate manner so as to correct the fuel flow accordingly. However, these mechanisms, especially those concerned with the sensing of engine speed, have not proved to be entirely satisfactory. The objections thereto usually arise from the fact that the speed input sense varies as the square of the speed, while the control output derived from the input sense normally is to be linear with respect to speed. This apparent incompatibility necessitates the use of complicated "feed back" cans and/or three dimensional cams.

It is now proposed to provide a force-balance system which will produce an output displacement which is linear with respect to speed from an input signal which varies as the square of the speed, without using any feed-back cams or three dimensional cams.

Other more specific objectives and advantages of the invention will become apparent when reference is made to the following specification and illustrations wherein:

Figure 1 is a view, partially in fragmentary cross-section and partially in schematic form, illustrating the invention and its application to a gas turbine power plant.

Figure 3:
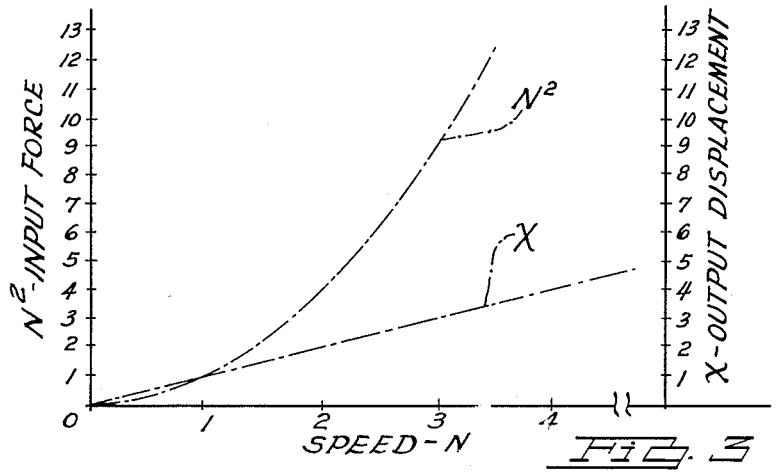
Figures 3 and 4 are graphs relating to the input force and output displacement of the invention.

Referring now in greater detail to the drawings, Figure 1 illustrates a turbine power plant 10 having an outer housing 12 with an intake 14 and exhaust nozzle 16. A combustion chamber 18 having a fuel distribution ring 20 therein, is located within the housing 12 between the compressor 22 and turbine 24. A gear box indicated generally at 26 may be provided in order to drive various engine accessories such as certain components of the fuel control as indicated schematically at 28.

The square root device 30, and the fragmentary portion surrounding it, may in reality be considered as an integral portion of the entire fuel control 28. The device 30 is shown in enlarged cross-section for purposes of clarity; the fuel control 28 not forming any part of the invention, is illustrated schematically in order to show one possible use for the output of the device 30.

As illustrated, the device 30 is contained generally by the housing 32 of the fuel control 28. A cylindrical cavity 34 formed within housing 32 contains a sleeve member 36 which is held stationary with respect to the housing 32, as by shoulder portions 38, spacer 40 and threaded stop member 42. A generally cylindrical chamber 44 formed internally of sleeve member 36 contains a piston 46 which in effect divides the chamber 44 into two distinct and variable chambers 48 and 50.

The sleeve member 36 slidably receives the piston 46 at one end thereof so as to allow the piston to respond to variations in pressures which exist in both chambers 48 and 50. The piston 46 has two different effective diameters 52 and 54 which in turn create different projected areas exposed to different pressures. The proposed structure employs a hydraulic system in order to provide these different pressures; however, it is conceivable that the pressures could also be supplied through a pneumatic system.

The piston 46 is provided with an extended portion 56 of reduced cross-sectional area, which may have a rack 58 formed thereon. The rack 58 cooperates with a gear 60 to move a fuel control valve 62, as by a transmission line 64, whenever the piston 46 moves in response to some input signal, the input signal in this case being a speed sense.

Normally, a fuel supply system comprised generally of a pump 66, supply conduits 68 and 70, and a fuel bypass having return conduit 72 and a bypass valve 74 therein, delivers fuel to the fuel control valve 62. The control valve 62 then meters the correct fuel flow for the particular engine operating requirements, as dictated by the various parameters. The present disclosure illustrates, as an example, the positioning of the fuel valve 62 with respect to the parameter of speed.

Arm members 76 and 78, having straddling rollers 80 and 82 mounted thereon intermediate of their ends, are formed to provide at one end thereof oppositely disposed spring pads 84 and 86 for the spring 88. The other ends, 90 and 92 of members 76 and 78, respectively, are pivotally received by cooperating indentations 94 and 96 within the extended portion 56. The rigid projection 98 is formed to provide a surface 100, which is parallel to the movement of piston 46 and along which the roller 80 may travel. In contrast to this, roller 82 is positioned adjacent an arm 110, which is pivotally mounted on a pin 112 and which has an inclined surface 114 against which roller 82 bears. The free end of member 110, being bifurcated, receives a poppet valve 116 by means of a cross pin 118 thereby allowing continual angular adjustment between valve 116 and the cooperating seat 120.

When the engine speed increases, the base member 129 secured to the transmission shaft 128 increases its speed of rotation, carrying with it the flyweight mounting arms 131 and 133. With this well-known construction, it is apparent that as the rotational speed of assembly 122 increases, the flyweights 124 and 126 rotate about their respective pivotal mounting pins 125 and 127, causing a force to be applied to the thrust member 135. This applied force is then transmitted through the bearing member 137 to the member 139 slidably mounted on the transmission shaft 128. The extending portion 130, formed integrally on member 139 causes the force so created by the flyweights to be applied to the cooperating seat 132 formed in member 110.

The housing 32 may also provide suitable conduitry for communication of the various hydraulic or pneumatic pressures. Conduit 134 communicates with and delivers a high pressure $P_1$ to a branch conduit 136 and to the annular chamber 138 formed generally by chamber 34 and sleeve member 36. The pressure is then further communicated to chamber 48 by means of radially formed conduits 140 and chamber 50 by means of conduit 136 and restriction 142. The pressure in conduits 144 and 146 is derived from chamber 50 by means of a common conduit 148. One end of pin 150, which is slideably retained by housing 32, is exposed to the pressure within conduit 146 while the other end continually bears against valve 116, thereby balancing the valve with respect to any pressure differentials which might exist.

Pressure $P_1$ of course, exists as discussed above in all of the various passages and cavities when there is no flow through the system, by virtue of valve 116 being seated. However, if valve 116 should move to some open position, flow will occur and chamber 50 and conduits 148, 144 and 146 will have some lesser pressure $P_2$ due to the pressure drop across the restriction 142 in conduit 136. Pressure $P_2$ is, of course, greater than the sink or reference pressure $P_3$ which exists internally of the housing 32.

Operation

For purposes of illustration, let it first be assumed that the engine is running at some particular speed and that all of the details are in the positions shown. Now as the engine is accelerated, the gear box 26 rotates the speed sense 122 at an increasing rate, causing the flyweights to move outwardly and raise member 130. As the member 130 raises, lever 110 is rotated counterclockwise about pivot 112, causing valve 116 to raise off its coacting seat 120 and allowing the pressure within chamber 50 to go to $P_2$ which may closely approach the value $P_3$. At this time pressure $P_1$ which still exists in chamber 48, causes the piston 46 to move to the right thereby compressing spring 88. When the spring compresses to a point where the force through the roller 82 is sufficient to overcome the force of member 130, the valve 116 returns to its null position, allowing the entire system to come to a stable position. Of course, as piston 46 moves to either the left or right, the rack 58 adjusts the fuel flow by positioning the fuel control valve 62.

Figure 2:
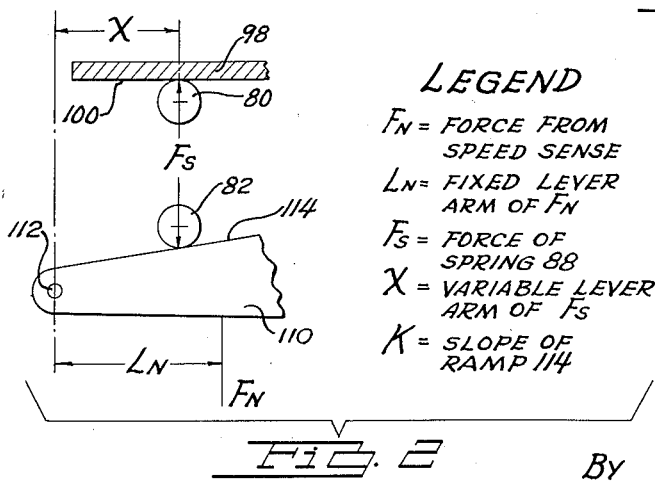
Figure 2 is a diagram illustrating the forces involved in the operation of the invention.

Figure 2 illustrates schematically the forces which are involved within the square root device. It becomes apparent on closer inspection that when the system is in equilibrium:

(1) $(Fs) \times (X) = (Fn) \times (Ln)$ and,
(2) $Fs = KX$
(3) While $Fn = N^2 K_1$ (where $K_1$ is a proportionality constant)
(4) Substituting 2 and 3 into 1,
$(KX) \times (X) = (N^2 K_1) \times (Ln)$
(5) Therefore, $KX^2 = N^2 K_1 Ln$ or $$X = \sqrt{N^2 K_1 \frac{Ln}{K}}$$

From this, it is evident that while the force of the input signal varies as the square of the input, the resulting output displacement varies in a linear fashion with respect to the input, or as the square root of the force of the input signal. Figure 3 graphically illustrates this relationship.

Figure 4:
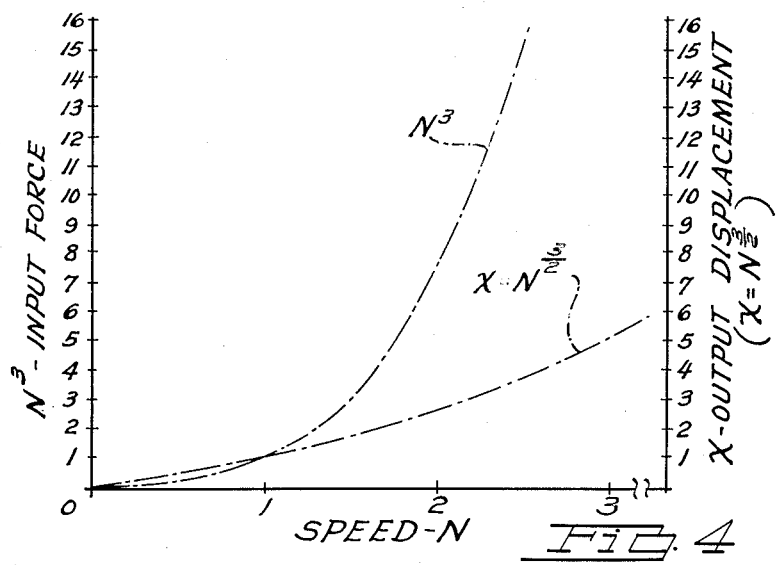

Figure 4, on the other hand, graphically illustrates that regardless of how the force of the input signal varies with respect to the input, the resulting output displacement still varies as the square root of the force of the input signal.

Although but one embodiment of the invention has been disclosed and described, it is apparent that other modifications are possible within the scope of the appended claims.

What we claim as our invention is:

1. In a mechanical computing device for creating an output movement of a magnitude proportional to the square root of the magnitude of the force input, a piston responsive to changes in pressure, lever members secured to said piston, spring means normally urging said members outwardly away from each other, a restraining member positively limiting the outward movement of one of said lever members, a pivotally-mounted second restraining member having an inclined restraining surface of uniform slope yieldingly limiting the outward movement of the other of said lever members, a servo valve connected to said second restraining member for varying the magnitude of the various pressures influencing the said piston, and means for directing a force input to said second restraining member at a distance away from the pivotal mounting thereof.

2. In a mechanical computing device for creating a linear movement of a magnitude equal to the square root of the magnitude of the force input, a two-diameter piston responsive to changes in pressure, lever members secured to said piston, spring means mounted between said lever members normally urging said members outwardly away from each other, a restraining member positively limiting the outward movement of one of said lever members, a pivotally-mounted second restraining member having an inclined restraining surface of uniform slope yieldingly limiting the outward movement of the other of said lever members, a servo valve connected to said second restraining member for varying the magnitude of the various pressures influencing the said two-diameter piston, and means for directing a force input to said second restraining member at a distance away from the pivotal mounting thereof.

3. In a mechanical computing device for creating a linear movement of a magnitude equal to the square root of the magnitude of the force input, a two-diameter piston responsive to changes in pressure, a plurality of lever members secured to said piston, a plurality of rollers secured to said lever members intermediate of the ends of said lever members, spring means mounted between said lever members normally urging said members and rollers outwardly away from each other, a rigid restraining member positively limiting the outward movement of one of said lever members and associated rollers, a pivotally-mounted second restraining member having an inclined restraining surface of uniform slope yieldingly limiting the outward movement of the other of said lever members and associated rollers, a servo valve connected to said second restraining member for varying the magnitude of the various pressures influencing the said two-diameter piston, and means for directing a force input to said second restraining member at a fixed distance away from the pivotal mounting thereof.

4. In a closed loop moment balance system, pressure responsive means adapted to be influenced by at least two distinct fluid pressures, a pivotally supported moment arm, means connected to said pressure responsive means for resiliently creating and sequentially applying an artificial reference force at various points along said moment arm, said moment arm being constructed in a manner so as to provide for a change in the magnitude of said resiliently created force in accordance with the points at which it is applied, valve means secured to the free end of said moment arm for varying the magnitudes of said distinct fluid pressures, and means for directing a force input to said moment arm for actuating said valve means.

5. In a closed loop moment balance system, pressure responsive means adapted to be influenced by at least two distinct fluid pressures, moment arm, means connected to said pressure responsive means for resiliently creating and sequentially applying an artificial reference force at various points along said moment arm, said moment arm being constructed in a manner so as to provide for a linear change in the magnitude of said resiliently created force in accordance with the points at which it is applied, valve means secured to a free end of said moment arm for varying the magnitudes of said distinct fluid pressures, and means for directing a force input to said moment arm for actuating said valve means.

6. In a closed loop moment balance system, pressure responsive means adapted to be influenced by at least two distinct fluid pressures, a moment arm, means connected to said pressure responsive means for resiliently creating and sequentially applying an artificial reference force at various points along said moment arm, said moment arm being constructed in a manner so as to provide for a change in the magnitude of said resiliently created force in accordance with the points at which it is applied, valve means secured to a free end of said moment arm for varying the magnitudes of said distinct fluid presure, and means for directing a force input to said moment arm for actuating said valve means.

7. A mechanical computing device, comprising pressure responsive means, conduit means for directing a pressurized actuating fluid to said pressure responsive means, a moment arm, means connected to said pressure responsive means for resiliently creating and sequentially applying an artificial reference force at various points along said moment arm, said moment arm being constructed in a manner so as to provide for a linear change in the magnitude of said resiliently created force in accordance with the points at which it is applied, valve means operatively connected to said moment arm for varying the magnitude of the pressure of said actuating fluid, and means for directing a force input to said moment arm for actuating said valve means.

8. A closed loop moment balance system, comprising pressure responsive means, conduit means for directing an actuating fluid to said pressure responsive means, a moment arm, means connected to said pressure responsive means for resiliently creating and sequentially applying an artificial reference force at various points along said moment arm, said moment arm being constructed in a manner so as to provide for a change in the magnitude of said resiliently created force in accordance with the points at which it is applied, valve means operatively connected to said moment arm for varying the magnitude of the pressure of said actuating fluid, and means for directing a force input to said moment arm for actuating said valve means.

References Cited in the file of this patent

UNITED STATES PATENTS

| | | |
|---|---|---|
| 1,106,434 | Woodward | Aug. 11, 1914 |
| 1,154,062 | Samuelson | Sept. 21, 1915 |
| 1,353,656 | Heisler | Sept. 21, 1920 |
| 2,560,914 | Almeras | July 17, 1951 |
| 2,647,493 | Whitehead et al. | Aug. 4, 1953 |